Sept. 17, 1968     A. MARZOCCHI     3,402,064
GLASS FIBER REINFORCED ELASTOMERS AND COMPOSITION
FOR SIZING AND IMPREGNATING SUCH
GLASS FIBER SYSTEMS
Filed Sept. 21, 1964
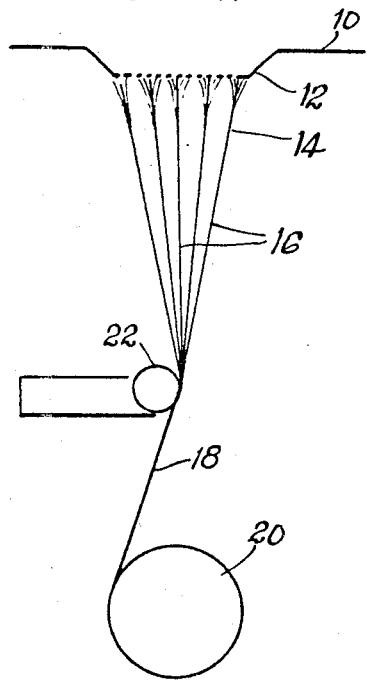
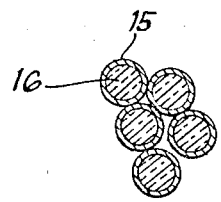
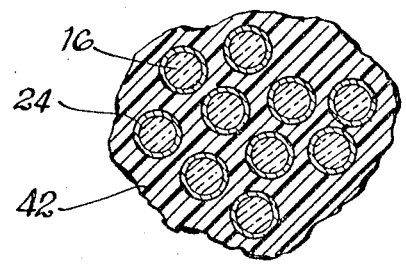
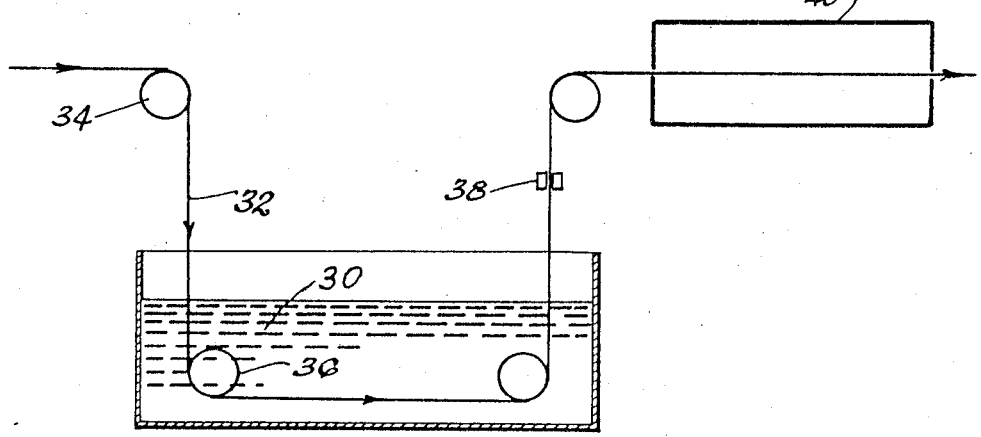
INVENTOR
Alfred Marzocchi
By Staelin and Overman
Attys United States Patent Office 3,402,064
Patented Sept. 17, 1968

3,402,064
GLASS FIBER REINFORCED ELASTOMERS AND COMPOSITION FOR SIZING AND IMPREGNATING SUCH GLASS FIBER SYSTEMS
Alfred Marzocchi, Cumberland, R.I., assignor to Owens-Corning Fiberglas Corporation, a corporation of Delaware
Filed Sept. 21, 1964, Ser. No. 397,956
12 Claims. (Cl. 117—72)

ABSTRACT OF THE DISCLOSURE

Glass fibers in bundle form in which the glass fibers in the bundle are coated or in which the bundle of glass fibers is impregnated with a composition the solids of which consist essentially of a solubilized neoprene rubber, powdered magnesium oxide, powdered zinc oxide and carbon black present in the ratio of 2–10 parts by weight zinc oxide, 2–10 parts by weight magnesium oxide and 5–30 parts by weight of carbon black per 100 parts by weight of neoprene and which, when used as a size, the composition contains an anchoring agent in the form of an organo silicon compound or Werner complex compound in which the organic group attached to the silicon atom of the organo silicon compound and the carboxylato group of the Werner complex compound contains either an amino group or an epoxy group and it relates also to compositions of the type described for sizing and impregnating such glass fiber systems.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term glass fibers, as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered to form a sliver which is drafted into a yarn; and to woven and non-woven fabrics formed of such yarns of discontinuous fibers and (3) combinations of such continuous and discontinuous fibers in strand, yarn, cord, and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment in forming or afterwards of bundles, yarns, cords, strands and fabrics formed of glass fibers to enable fuller utilization to be made of the desirable characteristics of the glass fiber when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combinations with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing, in which—

FIGURE 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIGURE 2 is a flow diagram illustrating the treatment of glass fibers subsequent to their being formed into bundles, strands, yarns, cords or fabrics to impregnate the glass fiber bundles in accordance with the preferred practice of this invention;

FIGURE 3 is a cross-sectional view of glass fibers processed in accordance with the diagram illustrated in FIGURE 1; and FIGURE 4 is a cross-sectional view of a bundle of glass fibers processed in accordance with the flow diagram of FIGURE 2.

To the present, glass fibers which have been added or otherwise incorporated with elastomeric materials in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber-elastomeric products.

The following examples will serve to illustrate the principal concepts of this invention in a composition and method for the treatment, as by impregnation, of bundles, yarns, cords and fabrics of glass fibers wherein the fibers have previously been sized in forming with a conventional size composition which has preferably been modified to embody a glass fiber anchoring agent:

EXAMPLE 1

Forming size composition

| | Percent by weight |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-aminopropyltriethoxy silane | 1.0 |
| Water | 88.6 |

EXAMPLE 2

Forming size composition

| | Percent by weight |
|---|---|
| Saturated polyester resin | 3.2 |
| Fatty acid amine wetting agent (Nopcogen 16L) | 0.1 |
| Polyvinyl alcohol | 0.1 |
| Pyrrolidine | 3.0 |
| Gamma-aminopropyltriethoxy silane | 0.3 |
| Glacial acetic acid | 0.1 |
| Water | 93.2 |

EXAMPLE 3

Forming size composition

| | Percent by weight |
|---|---|
| Paraffin wax in aqueous emulsion | 0.2 |
| Cationic amide polyester resin | 1.3 |
| Polyglycol condensate (300 to 400 mw.) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

Referring now to the schematic diagram of FIGURE 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristics or appearance of the fiber.

The strand 18 of sized glass fibers is preferably plied with other strands and twisted to form yarns, threads, or cords which may be used as a reinforcement for elastomeric materials, with or without cutting to shorter lengths, and which can be formed into woven or nonwoven fabrics for subsequent combination with elastomeric materials.

After the fibers have been processed into yarns, strands, threads, cords or fabrics, hereinafter referred to generally as bundles, the bundles of glass fibers are treated to impregnate the bundle by a composition which may be illustrated in the following example:

EXAMPLE 4

Impregnating composition

| | Parts by weight |
|---|---|
| Neoprene rubber | 100 |
| Powdered magnesium oxide | 4 |
| Zinc oxide | 5 |
| Carbon black | 15 |
| Toluene | 700 |

The neoprene rubber is milled to reduce the rubber to a state for solubility in the toluene or other organic solvent. In practice, the neoprene is milled to a Mooney value of 74 and a ten point scratch of 22 minutes. This operates to break down the rubber molecule for solution in the solvent. The solid particles of magnesium oxide, zinc oxide and carbon black can be added to the rubber in the milling operation or afterwards.

Impregnation of the sized glass fiber bundle is preferably achieved with a solvent bushing. In the alternative, the impregnating composition can be provided in the form of a bath 30 into which the glass fiber bundle is immersed by passing the continuous glass fiber bundle 32 over roller 34 then downwardly under and about the submerged roller 36 and then upwardly through a wiper bushing 38 which is adapted to remove excess impregnating composition from the impregnated fibrous bundle. It is preferred to effect impregnation while the bundle is caused to turn sharply about the roller 36 to open the bundle and thereby to achieve fuller access to the interstices between the fibers in the interior of the bundle for fuller impregnation.

The bundle of glass fibers, impregnated with a composition of Example 4, can be allowed to air dry but it is preferred to accelerate drying and to set the impregnating composition in the fiber bundle by advancing the impregnated bundle through an air circulating oven 40 heated to a temperature within the range of 200° to 375° F. for a period of 1 to 15 minutes.

The temperature, pressure and time of milling the neoprene are not critical, it being desirable only to reduce the neoprene to a Mooney value within the range of 30 to 80 and to a ten point scratch which does not go below 15 minutes but in which the upper value is unlimited, with a practical top of about 50 minutes. Other suitable solvents for neoprene may be employed, such as aromatic petroleum solvents, as represented by benzene, naphthalene and the like, or other hydrocarbon ketone or ester solvents.

The amount of powdered magnesium oxide and zinc oxide can be varied within the range of 2 to 10 parts by weight magnesium oxide per 100 parts by weight neoprene, and 2 to 10 parts by weight zinc oxide per 100 parts by weight neoprene, and the amount of carbon black can be varied within the range of 5 to 30 parts by weight per 100 parts by weight neoprene.

It is desirable to achieve as full impregnation as possible into the strand for more effective separation of the fibers one from the other by the neoprene since the neoprene becomes effective as a coating 42 between the sized glass fibers to cushion the fibers and to militate against destruction of the fibers by mutual abrasion. The deeper the penetration into the bundle by the impregnant, the more effective will be the bond or tie-in between the fiber bundle and the elastomeric material with which the bundle of glass fibers are combined in the manufacture of glass fiber reinforced elastomeric products. In the final product, the elastomeric material will form the continuous phase and such continuous phase of elastomeric material can be the same as the neoprene in the composition with which the glass fiber bundle is impregnated or it can differ therefrom and it can be cured or uncured or vulcanized or unvulcanized. The tie-in between the impregnated glass fiber bundle and the continuous phase of elastomer with which the impregnated bundles of glass fibers are combined in the manufacture of glass fiber-elastomeric products will take place primarily during the cure or vulcanization of the elastomeric material forming the continuous phase.

More complete protection for the individual fibers and more complete tie-in with the continuous phase of the elastomeric material can be achieved when the impregnating composition of Example 4 is properly modified to adapt the composition for use as a forming size applied to the individual glass filaments as they are formed, as in Examples 1 to 3. For this purpose, the impregnating composition of Example 4 and the indicated modifications thereof should be formulated to include an anchoring agent as represented by gamma-amino-propyltriethoxy silane or other amino silane. Instead, use can be made of an epoxy silane or a Werner complex compound in which the carboxylato group coordinated with the trivalent nuclear chromium atom contains an amino group or an epoxy group as represented by aminopropylato chromic complex, glycine chrome complex, β-alanine chrome complex.

The following is an example of a forming size which may be employed in the practice of this phase of the invention:

EXAMPLE 5

| | Parts by weight |
|---|---|
| Neoprene rubber | 100 |
| Powdered magnesium oxide | 4 |
| Powdered zinc oxide | 5 |
| Carbon black | 15 |
| Gamma-aminopropyltriethoxy silane | 2 |
| Toluene | 1400 |

The size composition is applied instead of the forming size of Examples 1 to 3 and in the same manner. When the glass fibers are sized in forming with a composition of the type illustrated by Example 5, the sized fibers can be processed directly into strands, yarns, cords and fabrics for use in combination with elastomeric materials without the need for impregnation of the fiber bundles since the individual fibers in the bundle are already provided with the coating 50 having the desired components for anchoring the elastomeric material and for protecting the glass fibers.

When use is made of a forming size wherein the formed glass fiber bundle is subsequently to be impregnated for loading with an elastomeric impregnant such as that illustrated by Example 4, the forming size is formulated to have a solids content within the range of 0.25 to 3.0 percent by weight and preferably within the range of 0.5 to 1.0 percent by weight and it is desirable to apply the size composition to provide for a dry coating weight on the order of about 0.5 to 1.0 percent by weight of the sized fibers. When use is made of a forming size intended also for use in loading the fibers with an elastomeric component, as represented by Example 5 or modifications thereof, the solids content should be considerably higher such as within the range of 10 to 50 percent by weight solids with the intent of incorporating a dry coating weight within the range of 20 to 45 percent by weight of the treated glass fiber systems. When use is made of a composition, as in Example 4, for the impregnation of fibrous bundles in which the fibers have previously been sized in forming, as by Examples 1 to 3, it is desirable to make use of a composition containing 10 to 50 percent by weight solids to provide for a dry weight of 5 to 25 percent and preferably 10 to 15 percent by weight solids based upon the impregnated fibrous structure.

When use is made of an anchoring agent in the size composition, as in Example 5, it is desirable to provide the anchoring agent in an amount within the range of 0.1 to 1.0 percent by weight and preferably in an amount within the range of 0.15 to 0.3 percent by weight of the treating composition or in an amount within the range of 0.1 to 5.0 percent by weight of the neoprene.

It will be understood that the formulation of the size composition may also be employed as an impregnating composition since the anchoring agent will operate further to facilitate the bonding relationship between the continuous phase of elastomeric material and the glass fiber component.

It will be apparent from the foregoing that I have provided a new and improved composition and product for use as an improved component in combinations with elastomeric materials in the manufacture of elastomeric products.

It will be understood that invention exists not only in the composition and process in the treatment of glass fibers but in the treated or impregnated glass fiber product which is formed thereof and which finds enhanced utility in combinations with elastomeric materials.

It will be further understood that changes may be made in the details of formulation and method of application without departing from the spirit of the invention, especially as defined in the following claims.

I claim:

1. A composition for the treatment of glass fibers in filament and bundle form for use in the combination of glas fiber- electromeric systems comprising an organic solvent system in which the solids consist essentially of neoprene rubber which has been solubilized by working, powdered magnesium oxide, powdered zinc oxide and carbon black, with the materials present in the ratio of 2 to 10 parts by weight of magnesium oxide per 100 parts by weight of rubber, 2 to 10 parts by weight of zinc oxide per 100 parts by weight of rubber and 5 to 30 parts by weight of carbon black per 100 parts by weight of rubber.

2. A composition as claimed in claim 1 in which the neoprene rubber is a milled neoprene.

3. A composition for impregnating glass fiber bundles to enhance their combination with elastomeric materials in the manufacture of glass fiber-electromeric products comprising an organic solvent system containing 10 to 50 parts by weight of solids consisting essentially of solubilized neoprene rubber, powdered magnesium oxide, powdered zinc oxide and carbon black, in which the materials are present in the ratio of 2 to 10 parts by weight of magnesium oxide per 100 parts by weight of the rubber, 2 to 10 parts by weight of zinc oxide per 100 parts by weight of the rubber and 5 to 30 parts by weight of carbon black per 100 parts by weight of the rubber.

4. A composition for sizing glass fibers to enhance their combination with elastomeric materials in the manufacture of glass fiber-elastomeric products comprising an organic solvent system containing 0.25 to 3.0 percent by weight of solvents consisting essentially of solubilized neoprene rubber, powdered magnesium oxide, powdered zinc oxide, carbon black, and an anchoring agent selected from the group consisting of an organo silicon compound and a Werner complex compound in which the organic group attached to the silicon atom of the organo silicon compound and the carboxylato group coordinated with the chromium atom of the Werner complex contains a group selected from the group consisting of an amino group and an epoxy group and in which the materials are present in the ratio of 2 to 10 parts by weight of zinc oxide per 100 parts by weight of the neoprene, 2 to 10 parts by weight of magnesium oxide per 100 parts by weight of the neoprene, 5 to 30 parts by weight of carbon black per 100 parts by weight of the neoprene and in which the anchoring agent is present in an amount within the range of 0.1 to 5.0 parts by weight per 100 parts by weight of the neoprene.

5. A composition as claimed in claim 4 in which the anchoring agent is present in the composition in an amount within the range of 1 to 3 percent by weight of the size composition.

6. A composition as claimed in claim 4 in which the anchoring agent is gamma-aminopropyltriethoxysilane.

7. A glass fiber bundle, a thin forming size coating on the surfaces of the glass fibers in the bundle and an impregnant in the bundle of sized glass fibers in which the impregnant consists essentially of the combination of a solubilized neoprene, powdered magnesium oxide, powdered zinc oxide and carbon black, in which the materials are present in the ratio of 2 to 10 parts by weight of magnesium oxide per 100 parts by weight of the neoprene rubber, 2 to 10 parts by weight of zinc oxide per 100 parts by weight of the neoprene rubber, and 5 to 30 parts by weight of carbon black per 100 parts by weight of the neoprene rubber.

8. An elastomeric product comprising a continuous phase of an elastomeric material and glass fiber bundles distributed throughout the continuous phase of the elastomeric material, in which the glass fiber bundles are impregnated with a composition to enhance the bonding relationship between the continuous phase of the elastomeric material and the glass fiber bundles and in which the impregnant consists essentially of solubilized neoprene rubber, powdered magnesium oxide, powdered zinc oxide and carbon black, with the materials present in the ratio of 2 to 10 parts by weight magnesium oxide per 100 parts by weight of the neoprene rubber, 2 to 10 parts by weight of zinc oxide per 100 parts by weight of the neoprene rubber and 5 to 30 parts by weight of carbon black per 100 parts by weight of the neoprene rubber.

9. Glass fibers and a size present as a thin coating on the glass fiber surfaces in which the size coating consists essentially of the combination of a solubilized neoprene rubber, powdered magnesium oxide, powdered zinc oxide, carbon black and an anchoring agent selected from the group consisting of an organo silicon compound and a Werner complex compound in which the organic group attached to the silicon atom of the organo silicon compound and the carboxylato group coordinated with the chrominum atom of the Werner complex contains a group selected from the group consisting of an amino group and an epoxy group, with the materials present in the ratio of 2 to 10 parts by weight of magnesium oxide per 100 parts by weight of the neoprene rubber, 2 to 10 parts by weight of zinc oxide per 100 parts by weight of the neoprene rubber, 5 to 30 parts by weight of carbon black per 100 parts by weight of the neoprene rubber, and 0.1 to 5.0 parts by weight of the anchoring agent per 100 parts by weight of the neoprene rubber.

10. Sized glass fibers as claimed in claim 9 in which the anchoring agent is gamma-aminopropyltriethoxysilane.

11. An elastomeric product comprising an elastomer as the continuous phase and glass fibers distributed within the continuous phase of the elastomer and a thin size coating on the glass fiber surfaces to enhance the bonding relationship between the elastomeric material and the glass fiber surfaces, and in which the size coating consists essentially of the combination of a solubilized neoprene rubber, powdered magnesium oxide, powdered zinc oxide, carbon black and an anchoring agent selected from the group consisting of an organo silicon compound and a Werner complex compound in which the organic group attached to the silicon atom of the organo silicon compound and the carboxylato group coordinated with the chromium atom of the Werner complex contains a group selected from the group consisting of an amino group and an epoxy group, with the materials present in the ratio of 2 to 10 parts by weight of magnesium oxide per 100 parts by weight of the neoprene rubber, 2 to 10 parts by weight of zinc oxide per 100 parts by weight of the neoprene rubber, 5 to 30 parts by weight of carbon black per 100 parts by weight of the neoprene rubber, and 0.1 to 5.0 parts by weight of the anchoring agent per 100 parts by weight of the neoprene rubber.

12. An elastomeric product as claimed in claim 11 in which the anchoring agent is gamma-aminopropyltriethoxysilane.

References Cited

UNITED STATES PATENTS

| | | |
|---|---|---|
| 2,431,001 | 11/1947 | Sullivan. |
| 2,480,824 | 9/1949 | Murphy et al. ____ 117—104 X |
| 2,903,779 | 9/1959 | Owens. |
| 2,931,739 | 4/1960 | Marzocchi et al. |
| 3,144,428 | 8/1964 | Kost _____ 260—41.5 X |
| 3,252,278 | 5/1966 | Marzocchi et al. |

WILLIAM D. MARTIN, *Primary Examiner.*

R. HUSACK, *Assistant Examiner.*